US009938959B2

(12) United States Patent
Verhulst et al.

(10) Patent No.: US 9,938,959 B2
(45) Date of Patent: Apr. 10, 2018

(54) HUB AND BEARING SYSTEM AND A TURBINE COMPRISING THE HUB AND BEARING SYSTEM

(71) Applicant: AKTIEBOLAGET SKF, Göteborg (SE)

(72) Inventors: Laurens Verhulst, Utrecht (NL); Koos Welling, Utrecht (NL); Jascha Van Pommeren, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 291 days.

(21) Appl. No.: 14/781,675

(22) PCT Filed: May 7, 2013

(86) PCT No.: PCT/EP2013/059494
§ 371 (c)(1),
(2) Date: Oct. 1, 2015

(87) PCT Pub. No.: WO2014/161607
PCT Pub. Date: Oct. 9, 2014

(65) Prior Publication Data
US 2016/0053746 A1    Feb. 25, 2016

(30) Foreign Application Priority Data

Apr. 3, 2013   (WO) ................. PCT/EP2013/057048

(51) Int. Cl.
*F03D 3/06*   (2006.01)
*F03D 1/06*   (2006.01)
*F03D 80/70*  (2016.01)

(52) U.S. Cl.
CPC ............. *F03D 3/06* (2013.01); *F03D 1/0658* (2013.01); *F03D 80/70* (2016.05);
(Continued)

(58) Field of Classification Search
CPC .......... F03D 1/0691; F03D 3/06; F03D 3/062; F03D 3/064; F03D 11/0008; F03D 80/70;
(Continued)

(56) References Cited

U.S. PATENT DOCUMENTS 6,942,461 B2 *   9/2005   Wobben ................ F03D 1/0658
                                                      416/210 R
9,249,777 B2 *   2/2016   Khan .................... F03D 1/0625
(Continued)

FOREIGN PATENT DOCUMENTS

GB      2479380 A       10/2011
WO   2010040829 A2       4/2010
WO   2012146722 A2      11/2012

*Primary Examiner* — Woody Lee, Jr.
*Assistant Examiner* — Sang K Kim
(74) *Attorney, Agent, or Firm* — Bryan Peckjian; SKF USA Inc. Patent Dept.

(57) ABSTRACT

A bearing system supports a plurality of turbine blades; each blade being rotatable about a pitch axis relative to a bearing system hub. The hub, comprising a plurality of static frames having a conical structure including two or more legs with openings therebetween, is connected to a main shaft of the turbine. Dynamic frames include a conical structure and two or more legs with openings therebetween. Legs of the static frame pass through openings between the legs of the corresponding dynamic frame, and legs of the dynamic frame pass through openings between legs of the corresponding static frame. Each dynamic frame is connected to one of the blades and is rotationally mounted to the corresponding static frame by a first bearing unit and a second bearing unit, distally arranged along the pitch axis from the first bearing unit. A central hub portion interconnects first shaft sections of the static frames.

18 Claims, 6 Drawing Sheets

(52) U.S. Cl.
CPC ..... *F05B 2240/54* (2013.01); *F05B 2250/232* (2013.01); *F05B 2260/79* (2013.01); *Y02E 10/721* (2013.01)

(58) Field of Classification Search
CPC ................ F03D 1/0658; F05B 2240/54; F05B 2250/232; F05B 2260/79
See application file for complete search history.

(56) References Cited

U.S. PATENT DOCUMENTS

| | | | |
|---|---|---|---|
| 9,587,624 B2* | 3/2017 | Borgen | ................ F03D 1/0658 |
| 2010/0086409 A1 | 4/2010 | Whiley et al. | |
| 2017/0022973 A1* | 1/2017 | Morimoto | ............. F03D 1/0675 |

\* cited by examiner

HUB AND BEARING SYSTEM AND A TURBINE COMPRISING THE HUB AND BEARING SYSTEM

CROSS REFERENCE TO RELATED APPLICATION

This is a United States National Stage Application claiming the benefit of International Application Number PCT/EP2013/059494 filed on 7 May 2013, which claims the benefit of International Application Number PCT/EP2013/057048 filed on 3 Apr. 2013, both of which are incorporated herein by reference in their entireties.

FIELD OF THE INVENTION

This invention relates to a hub and bearing system for supporting an adjustment of a pitch of a plurality of blades of a turbine.

This invention further relates to a turbine comprising the hub and bearing system.

BACKGROUND OF THE INVENTION

Wind turbines are designed to convert wind into electricity, by turning a shaft connected to the generator positioned in a wind turbine housing, also known as a nacelle. The rotation of the generator shaft is achieved by wind turbine blades, normally three, that rotate due to the wind. In order to enable optimization of the output power of the wind turbine, the blades may be rotated around their longitudinal axis, also indicated as adjusting a pitch of the blade. In this way, the blades can be used to control the amount of wind power transferred from the wind to the generator.

In conventional wind turbines, a slewing bearing is often used for rotational support of each of the turbine blades relative to the turbine hub. One ring of the bearing is mounted to the hub and the blade is mounted to the other ring of the slewing bearing. Such a slewing bearing may be a ball or roller bearing having a dimension similar to the diameter of the root of the blade (in modern turbines up to 3 meters).

In an attempt to reduce the requirements with respect to stiffness of the typical slewing bearing, an alternative turbine rotor was proposed in GB 2479380. In this patent application, the turbine rotor comprises a hub with a plurality of stubs for connection with a respective blade. Each blade has a pair of spaced apart annular bearings located within a root end of the blade. Each stub protrudes into and is rotatably received within a respective spaced apart bearing and the blades are supported on the hub. A drawback of such a hub is that the stub shafts require a relatively large diameter in order to withstand the loads and the corresponding bearings are also rather large and bulky. As a result, the rotor mass is unacceptably high.

SUMMARY OF THE INVENTION

It is an object of the invention to provide an alternative hub and bearing system for connecting a plurality of blades to a hub in which the bearing dimensions may be strongly reduced and in which the mass of the hub may be reduced.

A first aspect of the invention provides a bearing system. A second aspect of the invention provides a turbine. A third aspect provides a hub.

According to a first aspect of the invention, this object is achieved by providing a bearing system for supporting a plurality of blades of a turbine (200), such that each blade is rotatable about a pitch axis relative to a hub of the bearing system. The hub is configured for being connected to a main shaft of the turbine and comprises a plurality of static frames configured for cooperating with corresponding dynamic frames, each configured for being connected to one of the blades. The static frames comprise a conical structure and have at two or more legs with openings in between. Each dynamic frame also comprises a conical structure and has two or more legs with openings in between, and is arranged such that the legs of the dynamic frame pass through the openings between the legs of the static frame, and the legs of the static frame pass through openings between the legs of the dynamic frame. Each dynamic frame is rotationally mounted to the corresponding static frame by means of a first bearing unit and a second bearing unit arranged at a distance along the pitch axis from the first bearing unit. Each static frame further comprises a first shaft section to which a first ring of the first bearing unit is mounted and comprises a second shaft section to which a first ring of the second bearing unit is mounted. The hub of the bearing system further comprises a central portion that interconnects the first shaft sections of the static frames.

Suitably, the central portion extends along an axis of the main shaft of the turbine, between a front axial side of the hub and a rear axial side of the hub. The legs of the static frames are also joined to central portion. This interconnection of the static frames at the heart of the bearing system couples the static frames firmly together, which significantly increases the strength and stiffness of the overall bearing system. As a result, a reduction in overall weight of the bearing system is possible which is of course preferred at the top of the tower of a wind turbine. The bearing system according to the invention may even completely replace a traditional hub of a wind turbine, for example, by attaching the main shaft of the wind turbine to the central portion of the hub.

The use of the bearing system according to the invention enables the first bearing unit and the second bearing unit to have strongly reduced dimensions, as they do not need to be connected to the outer diameter of a root-part of the blade. Furthermore, in contrast with a conventional hub that is adapted for slewing bearings, the hub in the bearing system of the invention does not require large-diameter circular interfaces, which enables a reduction in the mass of the hub. Furthermore, the first bearing unit is axially spaced apart from the second bearing unit, which also changes the bending loads which would be relatively strong on a conventional slewing bearing, into radial loads for the construction according to the invention. The radial loads require smaller bearings, meaning that the axial spacing of the second bearing unit with respect to the first bearing unit contributes to the possible reduction of the dimensions of the first bearing unit and the second bearing unit. The axial spacing between the first bearing unit and the second bearing unit in the bearing system according to the invention may, for example, have a similar dimension as a diameter of the blade root. So the increase of strength of the bearing unit due to the interconnection of the static frames and the significant reduction of the dimensions of each of the first bearing units and the second bearing units together allow the bearing system according to the invention to be lighter and more robust, while also allowing easier and more cost effective maintenance of the bearing system.

To enable such reduced diameter of the first bearing unit and the second bearing unit, the legs of each static frame and each dynamic frame may diverge from the first bearing unit and may converge again towards the second bearing unit, after having intermingled. Intermingling means that the legs of the static frame pass through the openings between the dynamic frame legs. Preferably, the static frame and the dynamic frame comprise three legs, so as to have a tripod construction. Such constructions enable that each of the dynamic frames may be rotated with respect to the static frame through a predefined pitch angle, which is defined by the dimensions of the openings and the legs of each static frame and each dynamic frame. The legs and openings of the static and dynamic frames are dimensioned depending on the radial and axial forces that act upon the root of the blade in use. In wind turbine applications, a tripod construction of the static frame and a tripod construction of the dynamic frame allow a relative rotation of up to 95 degrees. If a smaller range of relative angular motion is all that is needed then the static frame and the dynamic frame may comprise, for example, four legs.

Suitably, the bearing system has the same number of static frames interacting with dynamic frames as the number of blades that need to be connected to the bearing system. For example, when the wind turbine comprises three blades, the bearing system also comprises three static frames and three dynamic frames, one dynamic frame for each of the blades. Of course, if the wind turbine only comprises two blades or if the wind turbine comprises four blades, the number of static frames and dynamic frames is adapted accordingly.

An additional benefit when using smaller bearings in the bearing system according to the invention is that the pitching of the blades generates less friction which further reduces the requirements on, for example, any pitch-drive motor to rotate the blades—which again results in less weight of the bearing system. When using smaller first bearing units and second bearing units to connect the blades to the bearing system, these first bearing units and second bearing units may be replaced—preferably without the need to first remove the blades from the dynamic frames.

Blade pitch control is becoming more important. Conventionally, collective pitching is applied in which the pitch angle of each blade is adjusted together to optimize the power transfer from the wind to the turbine. However, as wind turbines become larger, also more dynamic pitching becomes important—even pitching of individual blades to ensure, for example, that the pressure experienced by each of the blades is better distributed. Typically, there are local differences in wind-speed, for example, at the lower end of the wind turbine compared to the upper end of the wind turbine. These differences may cause additional loads to be present on the shaft of the wind turbine and on the construction of the wind turbine as a whole. By individually controlling the pitch of the blades, even during the rotation movement of the blades around the shaft, the load variation experienced by the blade when rotating may be strongly reduced. So pitching of the blades will become even more important and so the requirements posed on the pitching system will also increase, making the replaceability of, for example, the first bearing units and the second bearing units an important aspect. So the bearing system according to the invention enables the use of smaller first bearing units and second bearing units which also enables a replacement of the first bearing units and second bearing units at reasonable cost, since replacement can be carried out without the use of cranes and can be performed without detaching the blades.

In the bearing system of the invention, each of the plurality of first bearing units are connected to a corresponding first shaft section, and the plurality of first shaft sections are interconnected at the central portion of the hub. The first shaft section may, for example be long enough to also enable the second bearing unit to be connected to this shaft section. In other words, the second shaft section is part of the first shaft section. However, in a preferred solution, the only connection between the first shaft section and the second shaft section is via the legs and conical structure of the static frame. As such, the first shaft section may be relatively short such that the space between the first bearing unit and the second bearing unit along the pitch axis is substantially empty. This construction further reduces a weight of the bearing system according to the invention.

In an embodiment of the bearing system, the static frame is conically shaped towards the first bearing unit and/or the second bearing unit. The static frame may thus have a first conical section that tapers towards the first shaft section and may have a second conical section that tapers towards the second shaft section. Correspondingly, the dynamic frame may be conically shaped towards the first bearing unit and/or the second bearing unit and may thus have a first conical section that tapers towards the first shaft section and may have a second conical section that tapers towards the second shaft section. The conical sections of the static frame and of the dynamic frames may be solid sections to which the legs of the respective frames are connected. Alternatively, the conical sections may consist of a frame structure that is formed by the legs of the respective dynamic and static frames.

The conical structures enable to minimize the dimensions of the first bearing unit and the second bearing unit. The minimum dimension of the first bearing unit and the second bearing unit are determined, for example, by the overall load they need to be able to withstand and by the axial spacing the first bearing unit and the second bearing unit. Still, to be able to rotate the dynamic frame, there has to be enough space between the legs of the static frame and between the legs of the static frame. A dual conical shape as described above of the static frame and the dynamic frame may be used to connect the static frame and the dynamic frame to each of the first bearing unit and the second bearing unit, while allowing enough space between the legs of the static frame and the openings between the legs of the dynamic frame to allow sufficient rotation of the dynamic frame relative to the static frame.

In an embodiment of the bearing system according to the invention, the legs of the static frame and the legs of the dynamic frame pass through the respective openings therebetween at a widest diameter of each static frame and of each dynamic frame. A benefit of this embodiment is that it enables, in use, to maximize the rotation angle of the dynamic frame relative to the static frame.

In an embodiment of the bearing system, the dimensions of the static frame and the dynamic frame are configured to enable a rotating of the dynamic frame relative to the static frame over an angle of 90 degrees or more. In a preferred embodiment, the rotation angle between the dynamic frame and the base frame is 95 degrees or more. As indicated before, the maximum rotation angle is determined by a width of the legs relative to the openings between the legs of each static and dynamic frame. As the blades and the loads experienced by the blades in wind turbines may be high, the dimensions of the legs may need to be quite significant which would strongly reduce the rotation angle. Increase of a dimension of the legs, for example, in a radial direction may increase the strength of the frame construction while still enabling a sufficiently large rotation angle.

In an embodiment of the bearing system, an inner-diameter of the first bearing unit and/or an inner-diameter of the second bearing unit is less than half a diameter of a root of the blade. The inner-diameter of the first bearing unit is typically a diameter of a shaft around which the first bearing unit is connected, and the inner-diameter of the second bearing unit is typically a diameter of a shaft around which the second bearing unit is connected. The inner-diameter of the first bearing unit and/or the inner-diameter of the second bearing unit may, for example, be less than 250 millimeters. Bearing units having such diameter are easily replaceable.

In an embodiment of the bearing system, the first bearing unit and/or the second bearing unit comprise self-aligning bearing units. A benefit of self-aligning bearing units is that they are able to withstand alignments errors between the inner ring and outer ring of the bearing unit which may be caused by a deformation of the bearing system. As such, the stiffness of the bearing system may be reduced compared to the known system in which slewing bearings are used. In the known wind turbine hub, a slewing bearing is used to connect the root of the blade to the hub. A stiff interface is required between the blade and the bearing and between the bearing and the hub, to ensure that the slewing bearings do not get damaged in operation. Using self-aligning bearing units in the first bearing unit and/or the second bearing unit, the stiffness requirements may be reduced which may result in a reduction of the overall weight of the bearing system. The self-aligning bearing may, for example, comprise spherical plain bearings or spherical roller bearings.

In an embodiment of the bearing system, the second ring of the first bearing unit is the inner ring of the first bearing unit, and the second ring of the second bearing unit is the inner ring of the second bearing unit. This configuration causes the dynamic frame to be connected to the inner ring of the first bearing unit and the second bearing unit. When the first bearing unit and the second bearing unit is, for example a spherical plain bearing having a solid lubricant, this connection of the dynamic frame to the inner ring causes the loading of the lubricant to be better spread throughout the lubricant which will increase the lifetime of the first bearing unit and the second bearing unit. Of course, also other configurations may be possible, in which, for example the first ring of the first bearing unit may be the inner ring of the first bearing unit, and the second ring of the first bearing unit may be the outer ring of the first bearing unit. Similar, the first ring of the second bearing unit may be the inner ring of the second bearing unit, and the second ring of the second bearing unit may be the outer ring of the second bearing unit. In such a configuration, the dynamic frame may be connected to the outer ring of the first bearing unit and the second bearing unit.

In an embodiment of the bearing system, the first bearing unit and/or the second bearing unit comprise plain bearings. Bearings used in pitch adjustment systems for wind turbines only rotate over a limited angle. Rolling element bearings are not ideal because such typical back and forth movement over a limited angle as is required in pitch movement of a wind turbine blade may cause poor lubrication in rolling element bearings. Especially when further increasing the pitch adjustment in wind turbines to generate substantially continuous individual pitch adjustment of individual blades—as described earlier—the rolling element bearings would wear out relatively fast. Plain bearings are much more suitable for such pitch adjustment movement in the first bearing unit and/or the second bearing unit as they may use solid lubricants. Using plain bearings having solid lubricants in the first bearing unit and/or the second bearing unit may result in substantially maintenance free first bearing unit and second bearing unit. A further benefit of plain bearings is that they provide a relatively large contact surface and are able to withstand relatively strong forces.

In an embodiment of the bearing system, the first bearing unit and/or the second bearing unit comprise a radial bearing and an axial bearing. A benefit of this embodiment is that the plurality of bearings in the first bearing unit and/or the second bearing unit may be selected specifically for load that will act upon them. This may significantly increase a lifetime of the first bearing unit and the second bearing unit. The radial bearing or radially supporting bearing is designed to especially withstand radial loads that act upon the dynamic frame, for example, as a result of the blade bending moments and to a lesser extend as a result of radial blade loads. Although radial bearings often can withstand some axial loads, the axial loads may seriously reduce the lifetime. The axial bearing or axially supporting bearing is designed to especially withstand axial loads that act upon the dynamic frame (i.e. on the blade). During the rotation of the blade around the shaft, radial loads and axial loads will be applied at the connection point between the dynamic frame and the static frame. Using a single bearing, for example, a single plain bearing in each of the bearing units may be possible, but may not be optimal to ensure good pitching support when adjusting the pitch of the blade during the operation of the wind turbine. As such, a combination of a radial bearing and an axial bearing in the first bearing unit and/or the second bearing unit may improve the pitching support of the blade during operation. The combination of the radial bearing and the axial bearing may be present in both the first bearing unit and the second bearing unit. Alternatively, one of the first and second bearing units may comprise only a radial bearing while the other of the first and second bearing units comprises a radial bearing arranged between two oppositely oriented axial bearings for taking up axial loads in both directions. Preferably, the first bearing unit then comprises only the radial bearing.

When the first bearing unit or the second bearing unit comprises radial and axial bearings, these bearings are preferably mounted in a concentric way, to ensure the self-aligning properties.

In an embodiment of the bearing system, the bearing system comprises one or more pitch-drive motors configured for adjusting the pitch of the blade. Due to the smaller dimensions of the bearing units and the resulting lower friction, the dimensioning of the pitch-drive motor may be reduced, further reducing a weight of the bearing system.

In an embodiment of the bearing system, the pitch-drive motor is configured for rotating the dynamic frame via a gear-ring, a segment of a gear ring, a belt drive or via a hydraulic actuator. In a preferred embodiment, the bearing system comprises a pitch-drive motor for each of the dynamic frames in the bearing system—to enable (individual) pitch control for each of the blades in the wind turbine.

In an embodiment of the bearing system, the dynamic frame is integrated into the blade. A benefit of this embodiment is that the connection between the dynamic frame and the blade can be optimized in a factory and need not be built on site when constructing the wind turbine. A blade typically has steel inserts at the root to realize the interface with a pitch bearing unit. The dynamic frame and the steel inserts may be integrated which would eliminate the need for a bolted ring and again reduce the overall weight.

In an embodiment of the bearing system, the bearing system comprises a fixation element configured for securing a position of at least one of the dynamic frames relative to the static frame for enabling a replacement of the first bearing unit and/or of the second bearing unit. This securing of the position may be done via any suitable means to ensure that the dynamic frame has a fixed position with respect to the static frame. Such a fixation of the relative position enables the removal and replacement of the first bearing unit and/or second bearing unit in the bearing system according to the invention. Especially when looking at dimensions typical for roots of the blades of wind turbines—which may have a diameter of up to 3 meters, the replacement of known slewing bearings is very costly and cumbersome. Due to the reduced size of the first bearing unit and the second bearing unit in the bearing system according to the invention, the first bearing unit and the second bearing unit arranged inside the bearing system may be replaced. The openings in the first tripod construction and the second tripod construction may be constructed to be large enough to enable the first bearing unit and/or the second bearing unit to be lifted in and out of the bearing system, which is feasible when using plain bearings and tripod constructions able to rotate over 90 degrees or more.

In an embodiment of the bearing system, the bearing system comprises three static frames being configured to cooperate with corresponding dynamic frames. A wind turbine having three blades is currently the most common wind turbine used in industry.

The turbine according to the second aspect comprises a generator having a main shaft for rotating the generator and comprises the bearing system according to the invention for connecting the plurality of blades to the main shaft. In an embodiment of the turbine, the main shaft is connected to the central portion of the hub of the bearing system, where the plurality of static frames is interconnected. Connecting the shaft to central portion enables a more direct transfer of forces to the main shaft. In an embodiment of the turbine, the turbine is a wind turbine or a tidal energy turbine.

The hub according to the third aspect of the invention is configured for being connected to a main shaft of the turbine. The hub comprises a plurality of static frames, wherein each static frame comprises a conical structure having two or more legs (107) with openings in between; a first shaft section for receiving a first bearing ring of the first bearing unit and a second shaft section for receiving a first bearing ring of the second bearing unit. The hub further comprises a central portion that interconnects the first shaft sections and the legs of the static frames.

These and other aspects of the invention are apparent from and will be elucidated with reference to the embodiments described hereinafter.

DETAILED DESCRIPTION OF THE INVENTION

Figure 1:
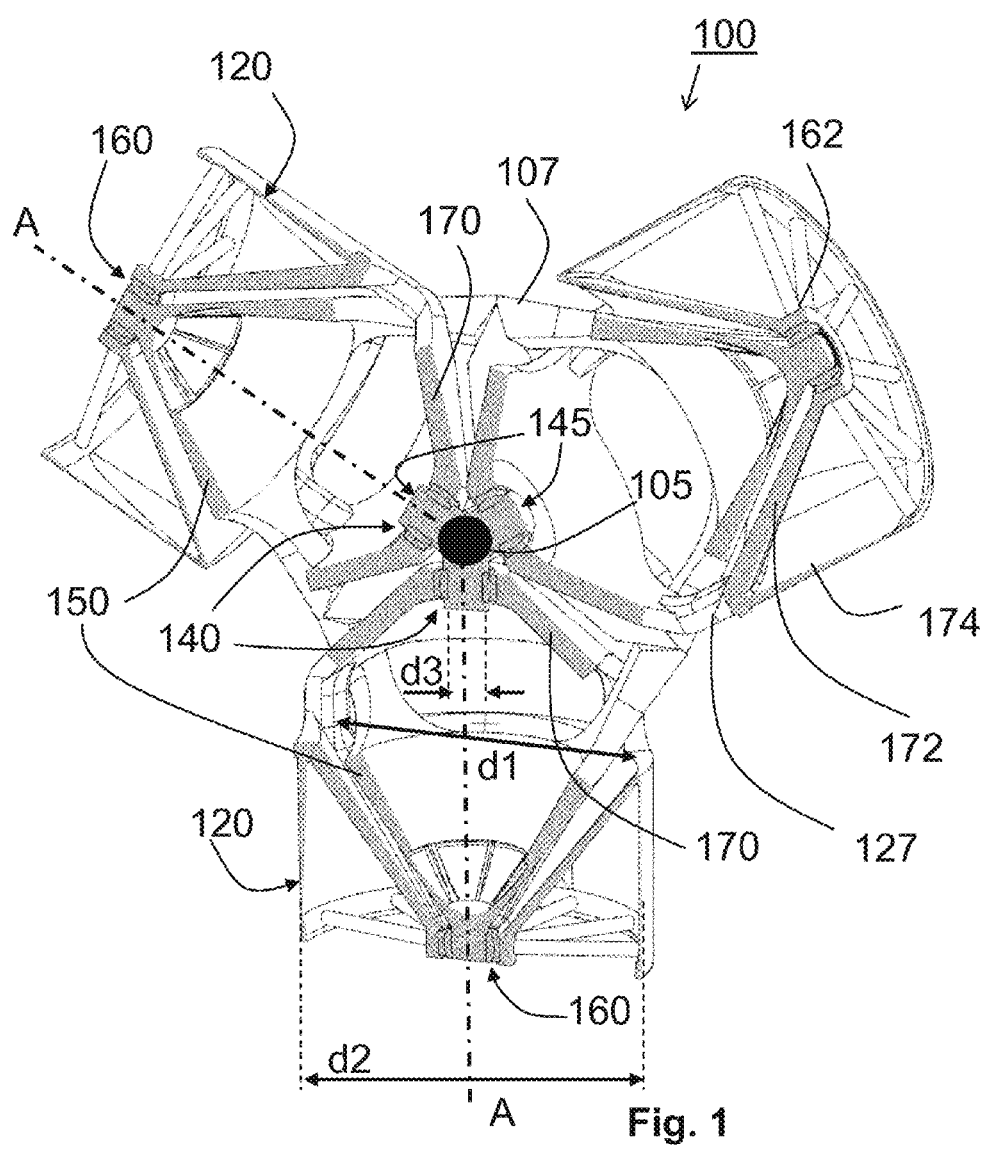
FIG. 1 illustrates a simplified cross-sectional view of the bearing system according to the invention.

FIG. 1 illustrates a simplified cross-sectional view of the bearing system 100 according to the invention. The bearing system 100 is configured for connecting a plurality of blades 210 (see FIG. 7) to a main shaft of a wind turbine 200. The bearing system 100 comprises a hub 101 (see also FIG. 2) that is coupled to the main shaft, and each blade 210 is rotationally supported relative to the hub 101 so as to be rotatable about a pitch axis A. The hub 101 comprises a plurality of static frames 110 which are connected to a plurality of dynamic frames 120, each via a first bearing unit 140 and a second bearing unit 160. Each dynamic frame 120 is connected to a blade 210 or forms an integral part of the blade root. In FIG. 1 the bearing system 100 comprises three dynamic frames 120 and three static frames. For clarity reasons, not all of the features common to each have been provided with reference numerals.

Figure 2:
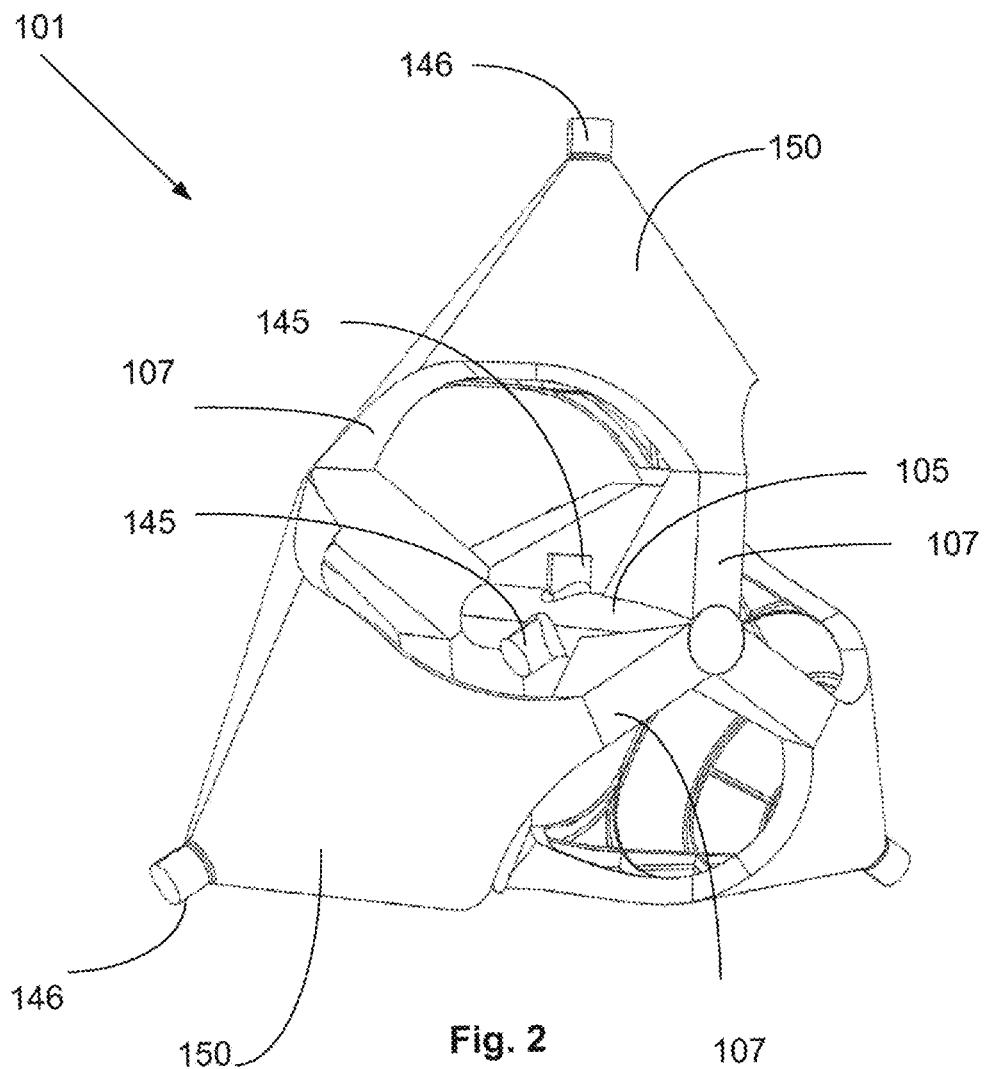
FIG. 2 illustrates a perspective view of a hub according to the invention.

With reference to FIG. 2, the hub 101 comprises three static frames 110. Each static frame 110 comprises a plurality of legs 107 arranged at even intervals around a circumference of the static frame. Preferably, the static frames 110 have three legs, such that each static frame has a tripod construction. The hub 101 further comprises a central portion 105 that extends in an axial direction and interconnects a front axial side of the hub and a rear axial side of the hub. Suitably, the hub 101 is adapted for coupling to the main shaft at the rear axial side of the hub, such that the central portion 105 extends along the axis of the main shaft. The three static frames 110 are arranged around the axis of the central portion 105, whereby the legs 107 of each static frame are connected to the central portion 105, such that the hub 101 forms a stiff and strong structure.

Each static frame 110 further comprises a first shaft section 145 with a seat for mounting a first bearing ring of the first bearing unit 140. In the depicted example, the first shaft section 145 is adapted for receiving an inner ring of the first bearing unit 140. Alternatively, the shaft section can be e.g. hollow, for receiving an outer ring of the first bearing unit 140. The three first shaft sections 145 extend from the central portion 105 along the pitch axis A. The first shaft sections 145 are therefore interconnected, which adds considerably to the strength and stiffness of the bearing system 100 as a whole. Furthermore, the loads on the first bearing unit 140 are transferred to the hub 101 at the central portion 105, which enables a much more direct transfer to the main shaft of the turbine in comparison with conventional hubs.

In the depicted example, each static frame 110 comprises a conical section 150 that connects the legs 107 of the tripod construction to a second shaft section 146 of the static frame, which has a seat for receiving a first bearing ring of the second bearing unit 160. The loads on the second bearing unit are therefore transferred though the conical section 150 to the legs 107 of the static frame, and then to the central portion, again enabling a more direct load path to the turbine main shaft. Instead of a conical section 150, the legs 107 of each static frame 110 may extend inwardly to adjoin the second shaft section 146 for receiving the second bearing unit 160.

As can be seen from FIG. 1, the space along the pitch axis A between the first bearing unit 140 and its corresponding second bearing unit 160 is empty. This contributes to a reduction of weight of the overall bearing system 100, and facilitates replacement of the first bearing unit 140, which will be explained in more detail later. Alternatively, the hub may comprise a single shaft that extends along the pitch axis A for each static frame 110, such that both the first bearing unit 140 and the second bearing unit 160 are mounted to the same shaft.

In the embodiment of FIG. 1, the first ring 180 (See FIG. 4) of the first bearing unit 140 is the inner ring 180 of the first bearing unit 140 and the first ring of the second bearing unit 160 is the inner ring of the second bearing unit 160. However, it will be apparent to the person skilled in the art that the first ring of the first bearing unit 140 may alternatively be the outer ring of the first bearing unit 140 and that the first ring of the second bearing unit 160 may alternatively be the outer ring of the second bearing unit 160.

For each static frame 110, the bearing system 100 comprises a corresponding dynamic frame 120. Each of the dynamic frames 120 comprises a first seat for receiving a second ring 182 (see FIG. 4) of the first bearing unit 140 and comprises a second seat 162 for receiving a second ring of the second bearing unit 160. In the embodiment of FIG. 1, the second ring 182 of the first bearing unit 140 is the outer ring 180 of the first bearing unit 140, and the second ring of the second bearing unit 160 is the outer ring of the second bearing unit 160. However, it will be apparent to the person skilled in the art that the second ring 182 of the first bearing unit 140 may alternatively be the inner ring of the first bearing unit 140 and the second ring of the second bearing unit 160 may alternatively be the inner ring of the second bearing unit 160.

In the depicted embodiment, each dynamic frame 120 also has three legs 127 arranged at regular intervals around a circumference of the dynamic frame. The legs 127 of the dynamic frame pass through openings between the legs 107 of the static frame. Similarly, the legs 107 of the static frames 110 pass through openings between the legs 127 of the dynamic frames 127. The dimensions of the dynamic frame legs 127 and openings in between and the dimensions of the static frame legs 127 and the openings in between determine how much the dynamic frame 120 may be rotated about the pitch axis A relative to the static frame 110 of the bearing system 100. In wind turbine applications, a relative rotation of up to 95 degrees is sufficient.

In the depicted embodiment, each dynamic frame has a first conical section 170 that extends from the legs 127 towards the first bearing unit 140. Suitably, the second bearing ring of the first bearing unit 140 is mounted at an apex of the first conical section 170. Each dynamic frame 120 may suitably comprise a second conical section 172 that extends from the legs 127 towards the second bearing unit 160. The second bearing ring of the second bearing unit 160 is suitably mounted at an apex of the second conical section 172. Further, each dynamic frame 120 may comprise a cylindrical section 174 for attachment of a blade root 220 of the turbine blade 210.

The axial spacing between the first bearing unit 140 and the second bearing unit 160, which is typically approximately equal to the blade root diameter, means that the bearing units are not subjected to the considerable bending moment from the blade 210. Consequently, bearings which are significantly smaller that conventional slewing bearings can be used in the bearing system 100 of the invention. The minimum dimension of the first bearing unit 140 and the second bearing unit 160 are determined, for example, by the overall load they need to be able to withstand and by the axial spacing between the first bearing unit 140 and the second bearing unit 160.

Furthermore, the conical shape of the static frame 110 and the dynamic frame 120 which are used to connect the static frame 110 and the dynamic frame 120 via each of the first bearing unit 140 and the second bearing unit160 allows enough space between the legs 107 of the static frame 110 and between the legs 127 of the dynamic frame 120 to enable sufficient relative rotation. Preferably, the legs 107 of the static frame 110 pass through the openings between the legs 127 of the dynamic frame 120 at a widest diameter dl of the static frame 110 and of the dynamic frame 120, to maximize the pitch angle of the dynamic frame 120 relative to the static frame 110. The pitching range up to 90 or 95 degrees would be preferred, in which the pitching range up to 35 degrees is mainly used for power control, while the pitching angle of 90 degrees may be used to "park" the blades 210 out of the wind (or "pitch" the blades 210 out of the wind).

As mentioned, the first bearing unit 140 and the second bearing unit 160 may be substantially smaller than an inner diameter d2 of the blade root 220. In FIG. 1 the inner-diameter d3 of the first shaft section 145 around which the first bearing unit 140 is arranged is significantly smaller than half the inner diameter d2 of the blade root 220 and may even be smaller than 250 millimeters (of course depending on the load). The inner-diameter (not indicated) of the second bearing unit 160 may be similar. This significantly reduces the dimensions of the first bearing unit 140 and the second bearing unit 160, making it much easier to replace the first bearing unit 140 and the second bearing unit 160 during the life-time of the wind turbine 200, preferably without removing the blades 210 of the wind turbine 200.

This is especially beneficial as the pitching of the blades 210 will become more important for larger wind turbines 200. As is indicated in the introductory part, individual pitching of the blades 210 during the rotation of the blades 210 around the shaft of the wind turbine 200 will be done to reduce or balance the forces that variations in wind speed may cause on the wind turbine 200. This individual pitching will increase the wear within the first bearing unit 140 and the second bearing unit 160 which further increases the need for future replacement. A further benefit of these reduced dimensions of the first bearing unit 140 and the second bearing unit 160 is that they produce less friction when changing the pitch of the blade 210 of the wind turbine 200, which reduces any requirements on a pitch-drive motor 190 (see FIG. 5) and thus may reduce the overall weight of the bearing system 100 according to the invention.

Figure 3:
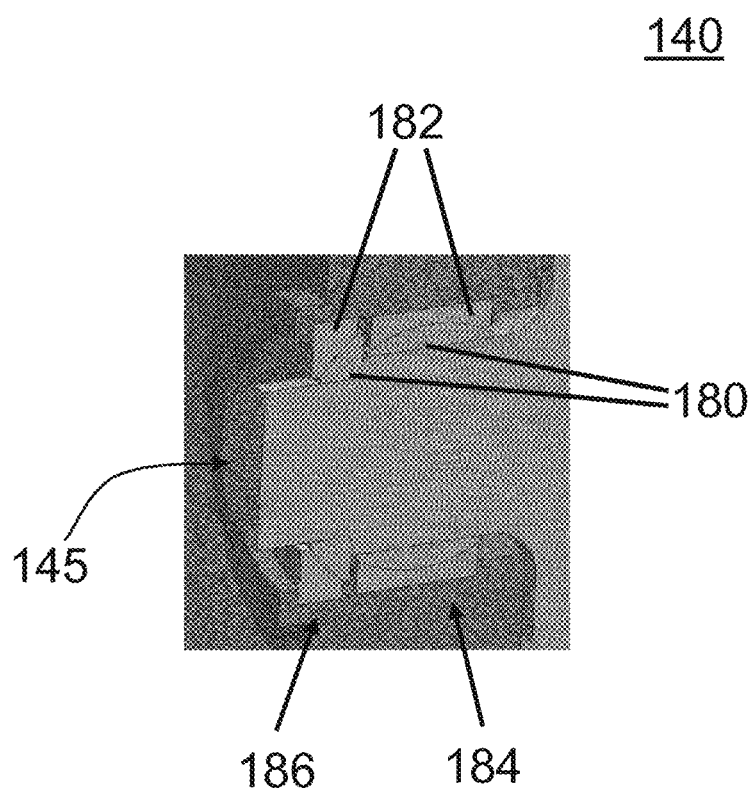
FIG. 3 illustrates a cross-sectional view of a first bearing unit according to the invention.
Figure 4:
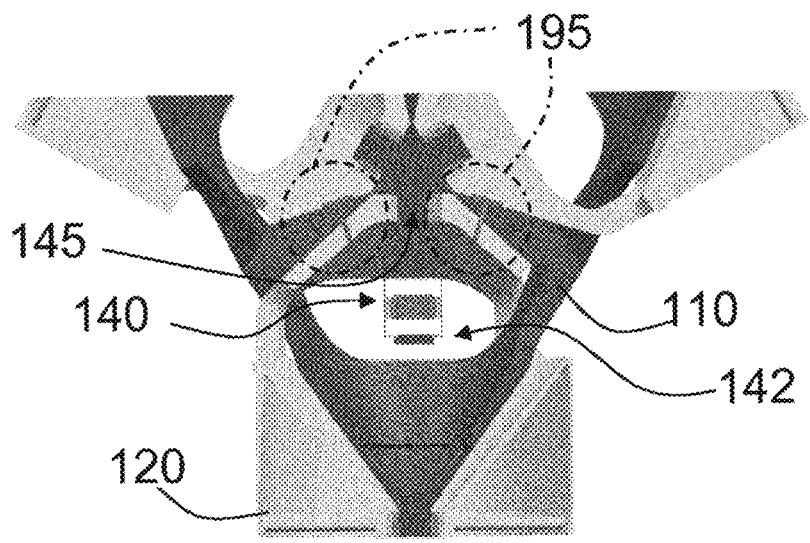
FIG. 4 illustrates a step in a replacement procedure of one of the first bearing units from the bearing system.

FIG. 3 illustrates cross-sectional view of a first bearing unit 140 according to the invention. Of course any of the first bearing units 140 or second bearing units 160 shown in FIGS. 1 and 6 may be constructed in a similar manner. The first bearing unit 140 shown in FIG. 3 comprises a radial bearing 184 and an axial bearing 186. In the current embodiment, the radial bearing 184 is a spherical plain bearing 184 which is designed for a radial load while this spherical plain bearing 184 may also support relatively small axial loads. The bigger the axial to radial load ratio, the shorter the lifetime of such bearing will be. The axial bearing 186 shown in FIG. 4 is an angular contact spherical plain bearing 186 which in principle may carry axial and radial loads. In the arrangement shown in FIG. 4, this angular contact spherical plain bearing 186 will only be loaded axially. Alternatively, the axial bearing 186 may be a thrust spherical plain bearing to support the axial loads. In a preferred embodiment, and as shown in FIG. 3, the radial bearing 184 and the axial bearing 186 are concentric such that the first bearing unit 140 may be able to withstand deformations of the construction of the bearing system 100. Each of the radial bearing 184 and the axial bearing 186 are connected with their second ring 182 (e.g. the outer ring 182) to the dynamic frame 120 (see FIG. 1) and are connected with their first ring 180 (e.g. the inner ring 180) to the static frame 110 (see FIG. 1) via the first shaft section 145. During the rotation of the blade 210 around the shaft (see FIG. 1), radial forces and axial forces will be applied at the connection point between the dynamic frame 120 (see FIG. 1) and the static frame 110 (see FIG. 1). The combination of the radial bearing 184 and an axial bearing 186 in the first bearing unit 140 improves the pitching support of the blade 210 during operation.

The first bearing unit 140 and/or the second bearing unit 160 may comprise self-aligning bearings. A benefit of the self-aligning bearing units 140, 160 is that they are able to withstand alignments errors between the inner ring180 and outer ring 182 of the self-aligning bearing unit 140, 160 which may be caused by a deformation of the bearing system 100. When using such self-aligning bearing units 140, 160, the stiffness of the bearing system 100 may be reduced compared to the known system in which slewing bearings are used. In the known wind turbine hub 240, a slewing bearing is used to connect the root 220 of the blade 210 to the hub 240. A stiff interface between the hub and one bearing ring and a stiff interface between the other bearing ring and the blade is required to ensure that the slewing bearings do not get damaged in operation. The stiff interfaces are realized by means of many bolts, for example, 70 bolts. Using the self-aligning bearing units 140, 160, the stiffness requirements may be reduced which again may contribute to the overall reduction of the weight of the bearing system 100. Self-aligning bearing 140, 160 may, for example, comprise spherical plan or spherical rolling element bearings.

FIG. 4 illustrates a step in a replacement procedure of one of the first bearing units 140 from the bearing system 100. Initially the dynamic frame 120 from which the first bearing unit 140 has to be replaced, should be fixed relative to its corresponding static frame 110 using fixation elements 195 (indicated in FIG. 4 as T-shaped fixation means inside the dash-dotted circles—the person skilled in the art understands that any fixation element 195 suitable to fix a position of the dynamic frame 120 relative to its corresponding static frame 110 may be used without departing from the scope of the invention). Next, a first cover element 142 is removed to allow the first bearing unit 140 to be removed from the first shaft section 145. Next the first bearing unit 140 may be removed and a replacement first bearing unit 140 may be inserted around the first shaft section145 after which the first cover element 142 may be repositioned. Next, the fixation elements 195 may be removed to allow the dynamic frame 120 to rotate again relative to the static frame 110.

FIG. 4 illustrates a step in a replacement procedure of one of the second bearing units 160 from the bearing system 100. Basically, the steps are similar, as initially the fixation elements 195 need to be put in place to ensure that the dynamic frame 120 is fixed relative to the static frame. A second cover element 162 is removed from the second shaft section 146. Next, the second bearing unit 160 is dismounted and a replacement second bearing unit 160 is mounted to the second shaft section 146. The second cover element 162 is then replaced and the fixation elements 195 are removed to allow the dynamic frame 120 to rotate again relative to the static frame 110.

Figure 5:
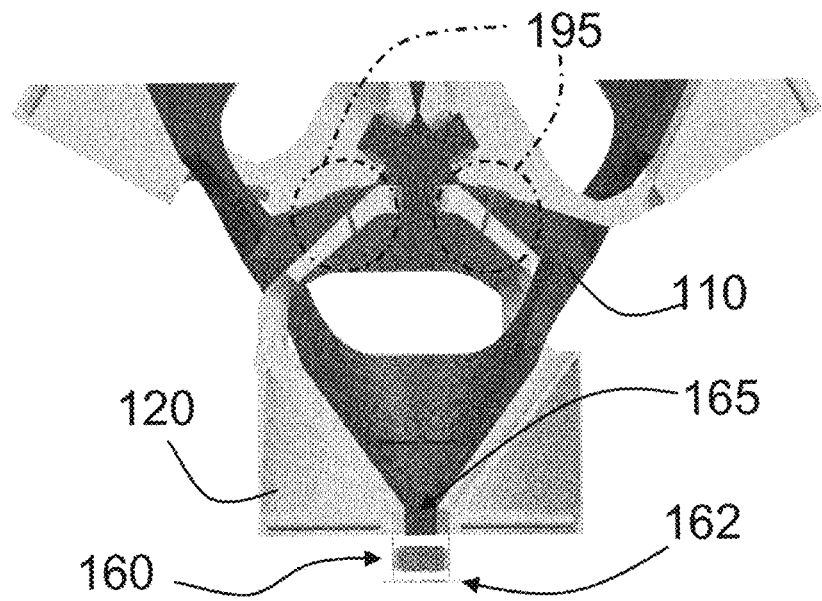
FIG. 5 illustrates a step in a replacement procedure of one of the second bearing units from the bearing system.

As indicated before, due to the bearing system 100 according to the invention, the dimensions of the first bearing units and second bearing units are reduced in comparison with conventional slewing bearings. The first and second bearing units are small enough to be transported to the top of the wind turbine through the tower 250. Consequently, there is no need for a crane or a large external hoist. As shown in FIGS. 4 and 5, this replacement may even be done without the need to first remove the blades 210 from the dynamic frames 120.

Figure 6:
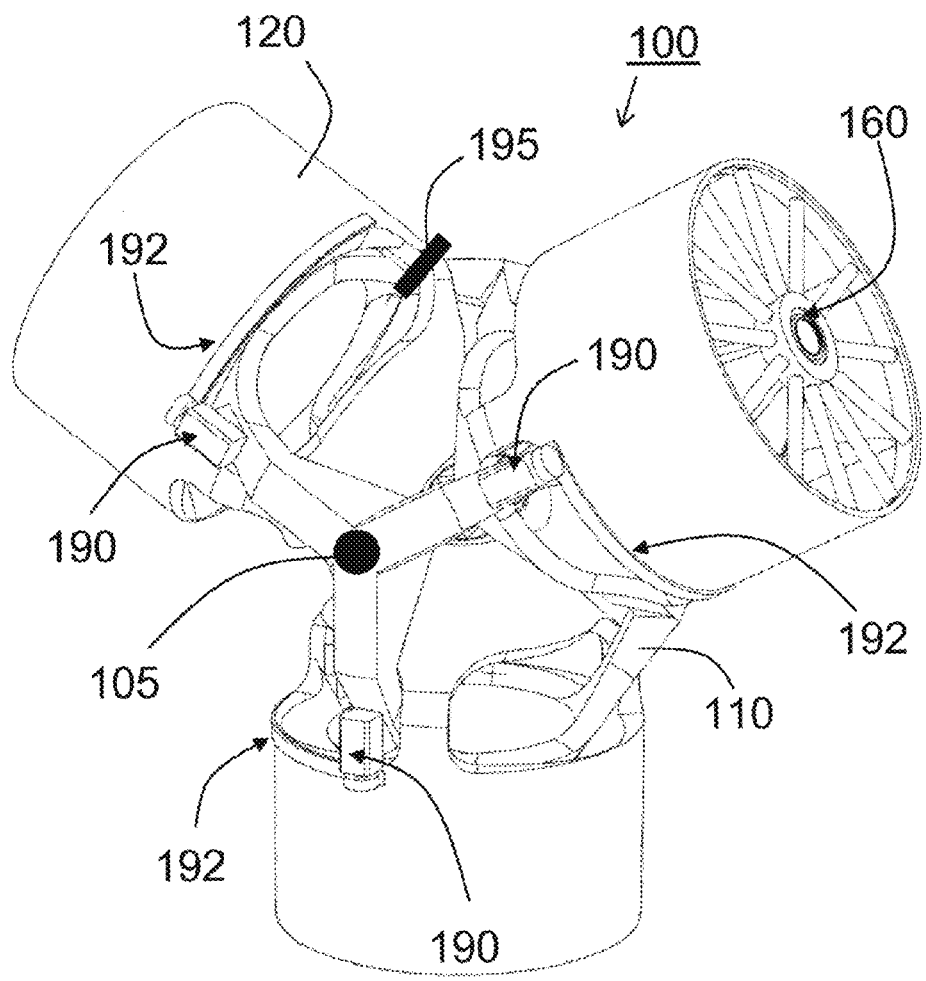
FIG. 6 illustrates a three-dimensional view of the bearing system according to the invention.

FIG. 6 illustrates a three-dimensional view of the bearing system 100 according to the invention. Again, the static frames 110, the dynamic frames 120 and the central portion of the hub of the bearing system 100 are indicated, together with the second bearing unit 160. Also shown in this three-dimensional view are the pitch-drive motors 190 together with a gear-ring segment192 for rotating the dynamic frames 120 relative to their corresponding static frames 110. Of course many different embodiments of the pitch-drive motors 190 together with gear-rings 192, belt drives (not shown) or hydraulic actuators (not shown) may be possible without diverting from the scope of the invention. Also illustrated in FIG. 6 is a fixation element 195 configured for securing a position of at least one of the dynamic frames 120 relative to the corresponding static frame 110 for enabling a replacement of the first bearing unit (not shown) and/or of the second bearing unit 160, as also illustrated in the FIGS. 5 and 6 above. Also in this embodiment, the fixation element 195 may by any element or may be multiple elements to secure the position of the dynamic frame 120 relative to its corresponding static frame 110.

Figure 7:
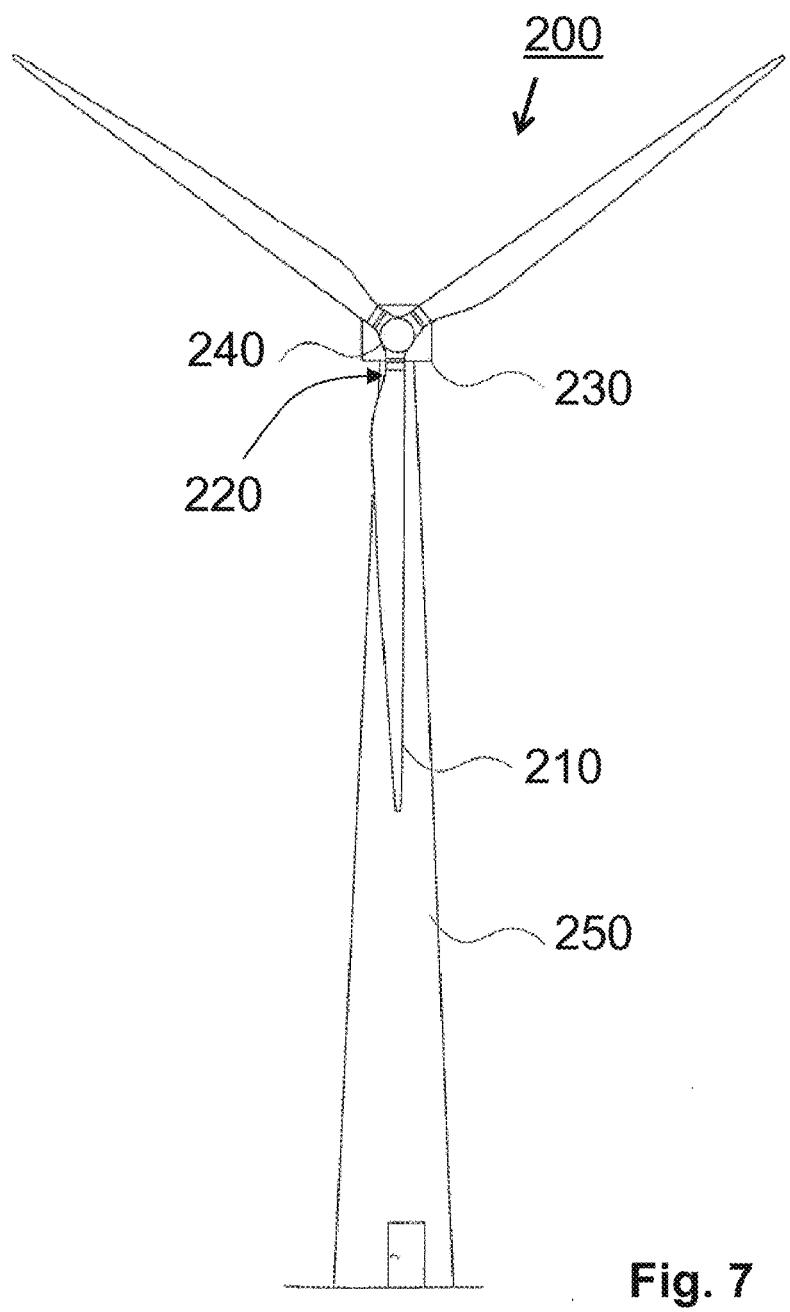
FIG. 7 illustrates a wind turbine comprising the bearing system according to the invention.

FIG. 7 illustrates a turbine 200 which may, for example, comprise the bearing system 100 according to the invention. The turbine 200 shown in FIG. 7 is a wind turbine 200 having a generator (and possibly a gearbox) arranged in the nacelle 230 and a plurality of blades 210 connected to the generator via a main shaft (not shown). The blades 210 are connected to a hub 240 which is executed as a hub as shown in FIG. 2. Suitably, the openings in the hub 101 according to the invention are enclosed in a housing, to prevent the ingress of moisture and other contaminants. The root 220 of each of the blades 210 is connected to the dynamic frame 120 (not shown) which can rotate around the pitch axis A (see FIG. 1) for adjusting a pitch of the blade 210. The nacelle 230 is built on top of a tower 250.

The interconnection of the plurality of static frames 110 at the central portion 105 of hub 101 provides strength and stiffness in the bearing system 100 of the invention, and removes the need for the hub to comprise large diameter circular interfaces for connection of the blades 210. Consequently, the hub 101 in the bearing system of the invention is considerably lighter than a conventional hub. The interconnection of the static frames 110 at the central portion 105 also enables a more direct load transfer to the main shaft of the turbine.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A bearing system adapted to support a plurality of blades of a turbine, such that each blade is rotatable about a pitch axis relative to a hub of the bearing system, wherein:
the hub is configured for being connected to a main shaft of the turbine and comprises a plurality of static frames which include a conical structure and have two or more legs with openings in between, the static frames being configured for cooperating with corresponding dynamic frames, which comprise a conical structure and have two or more legs with openings in between, whereby the legs of the static frame pass through openings between the legs of the corresponding dynamic frame, and the legs of the dynamic frame pass through openings between the legs of the corresponding static frame;
each dynamic frame is configured for being connected to one of the blades, each dynamic frame is rotationally mounted to the corresponding static frame by a first bearing unit and a second bearing unit arranged at a distance along the pitch axis from the first bearing unit,
each static frame further comprises a first shaft section having a first ring of the first bearing unit mounted thereto and a second shaft section having a first ring of the second bearing unit mounted thereto;
the hub further comprises a central portion which interconnects the first shaft sections of the static frames.

2. The bearing system according to claim 1, wherein the central portion extends along an axis of the main shaft and interconnects a front axial side and a rear axial side of the hub.

3. The bearing system according to claim 1, configured in accordance with at least one of:
wherein the static frame is conically shaped towards at least one of the first bearing unit and the second bearing unit, and
wherein the dynamic frame is conically shaped towards at least one of the first bearing unit and the second bearing unit.

4. The bearing system according to claim 1, wherein the legs of the static frame and the legs of the dynamic frame pass through the respective openings therebetween at a widest diameter of the static frame and the dynamic frame.

5. The bearing system according to claim 4, wherein the static frames and the dynamic frames each have three legs and the dimensions of the static frame legs and the openings therebetween and the dimensions of the dynamic frame legs and the openings therebetween are configured to enable a rotating of the dynamic frame relative to the static frame over an angle of at least 90 degrees.

6. The bearing system according to claim 1, wherein at least one of:
(a) an inner-diameter of the first bearing unit and
(b) an inner-diameter of the second bearing unit
is less than half a diameter of a root of the blade.

7. The bearing system according to claim 1, wherein at least one of the first bearing unit and the second bearing unit comprise self-aligning bearing units.

8. The bearing system according to claim 1, wherein the second ring of the first bearing unit is the inner ring of the first bearing unit, and wherein the second ring of the second bearing unit is the inner ring of the second bearing unit.

9. The bearing system according to claim 1, wherein at least one of the first bearing unit and the second bearing unit comprise plain bearings.

10. The bearing system according to claim 1, wherein at least one of the first bearing unit and the second bearing unit comprise a radial bearing and an axial bearing.

11. The bearing system according to claim 1, the bearing system further comprising at least one pitch-drive motor, wherein the at least one pitch-drive motor is configured for adjusting the pitch of the plurality of blades.

12. The bearing system according to claim 11, wherein the at least one pitch-drive motor is configured for rotating the dynamic frame via one of: a gear-ring, a belt drive or a hydraulic actuator.

13. The bearing system according to claim 1, wherein the dynamic frames are integrated into the blades.

14. The bearing system according to claim 1, the bearing system further comprising a fixation element configured for securing a position of at least one of the dynamic frames relative to the static frame for enabling a replacement of at least one of the first bearing unit and the second bearing unit.

15. The bearing system according to claim 1, the bearing system further comprising three static frames being configured to cooperate with corresponding dynamic frames.

16. A turbine comprising:
a generator having a main shaft for rotating the generator and
a bearing system, the bearing system adapted to support a plurality of blades of a turbine, such that each blade is rotatable about a pitch axis relative to a hub of the bearing system, wherein:
the hub is configured for being connected to a main shaft of the turbine and comprises a plurality of static frames which include a conical structure and have two or more legs with openings in between, the static frames being configured for cooperating with corresponding dynamic frames, which comprise a conical structure and have two or more legs with openings in between, whereby the legs of the static frame pass through openings between the legs of the corresponding dynamic frame, and the legs of the dynamic frame pass through openings between the legs of the corresponding static frame;
each dynamic frame is configured for being connected to one of the blades, each dynamic frame is rotationally mounted to the corresponding static frame by a first bearing unit and a second bearing unit arranged at a distance along the pitch axis from the first bearing unit,
each static frame further comprises a first shaft section having a first ring of the first bearing unit mounted thereto and a second shaft section having a first ring of the second bearing unit mounted thereto;
the hub further comprises a central portion which interconnects the first shaft sections of the static frames,
wherein the bearing system is integrated into the turbine.

17. The turbine according to claim 16, wherein the central portion of the hub is connected to main shaft.

18. The turbine according to claim 16, wherein the turbine is one of a wind turbine or a tidal energy turbine.

* * * * *